Sept. 7, 1943. E. L. FRALEY 2,328,971
REMOVABLE VEHICLE BODY AND MEANS FOR SUPPORTING SAME
Filed Nov. 20, 1940 2 Sheets-Sheet 1
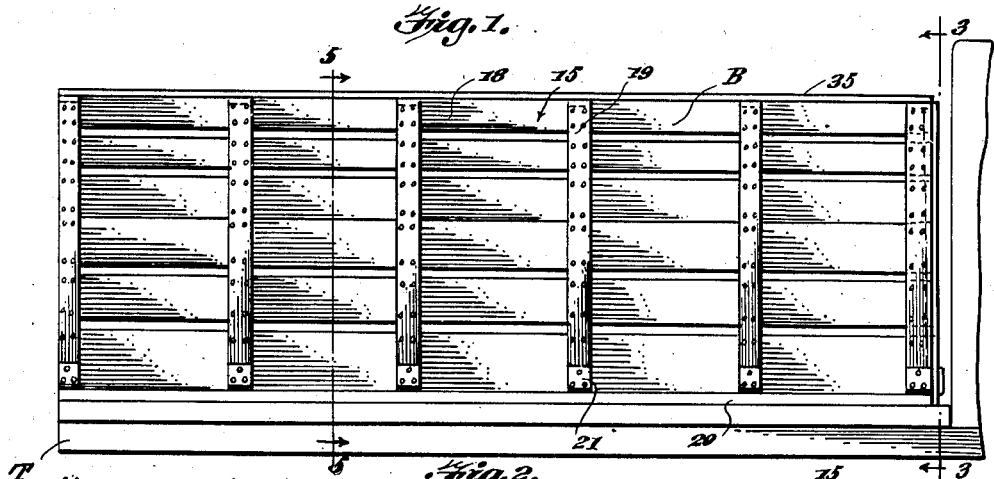
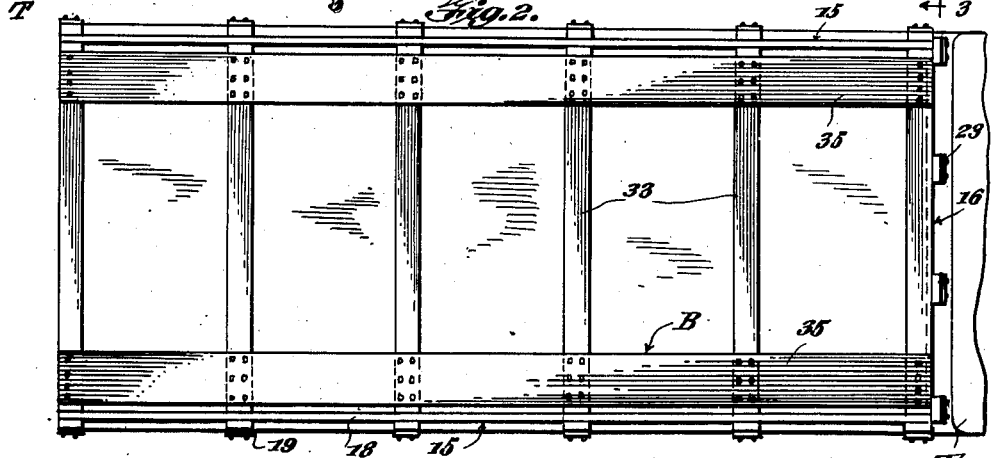
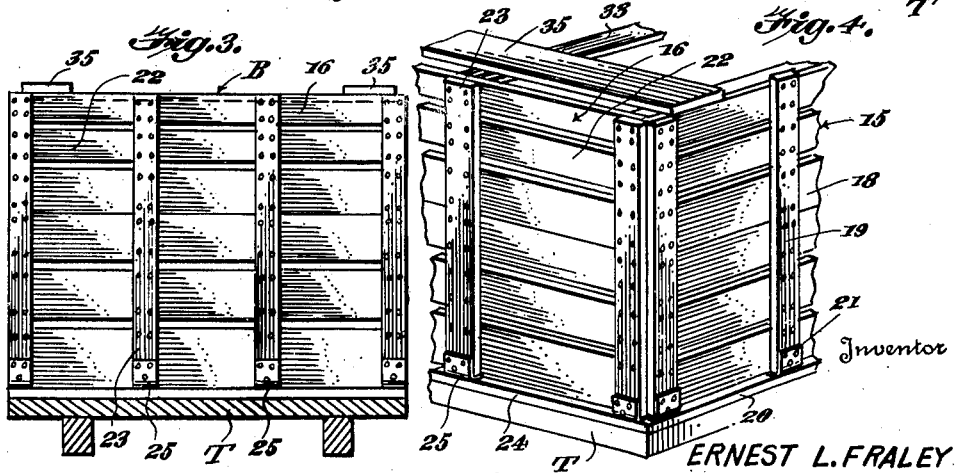
Inventor
ERNEST L. FRALEY
By Irving R. McCathran
Attorney Sept. 7, 1943.   E. L. FRALEY   2,328,971
REMOVABLE VEHICLE BODY AND MEANS FOR SUPPORTING SAME
Filed Nov. 20, 1940   2 Sheets-Sheet 2
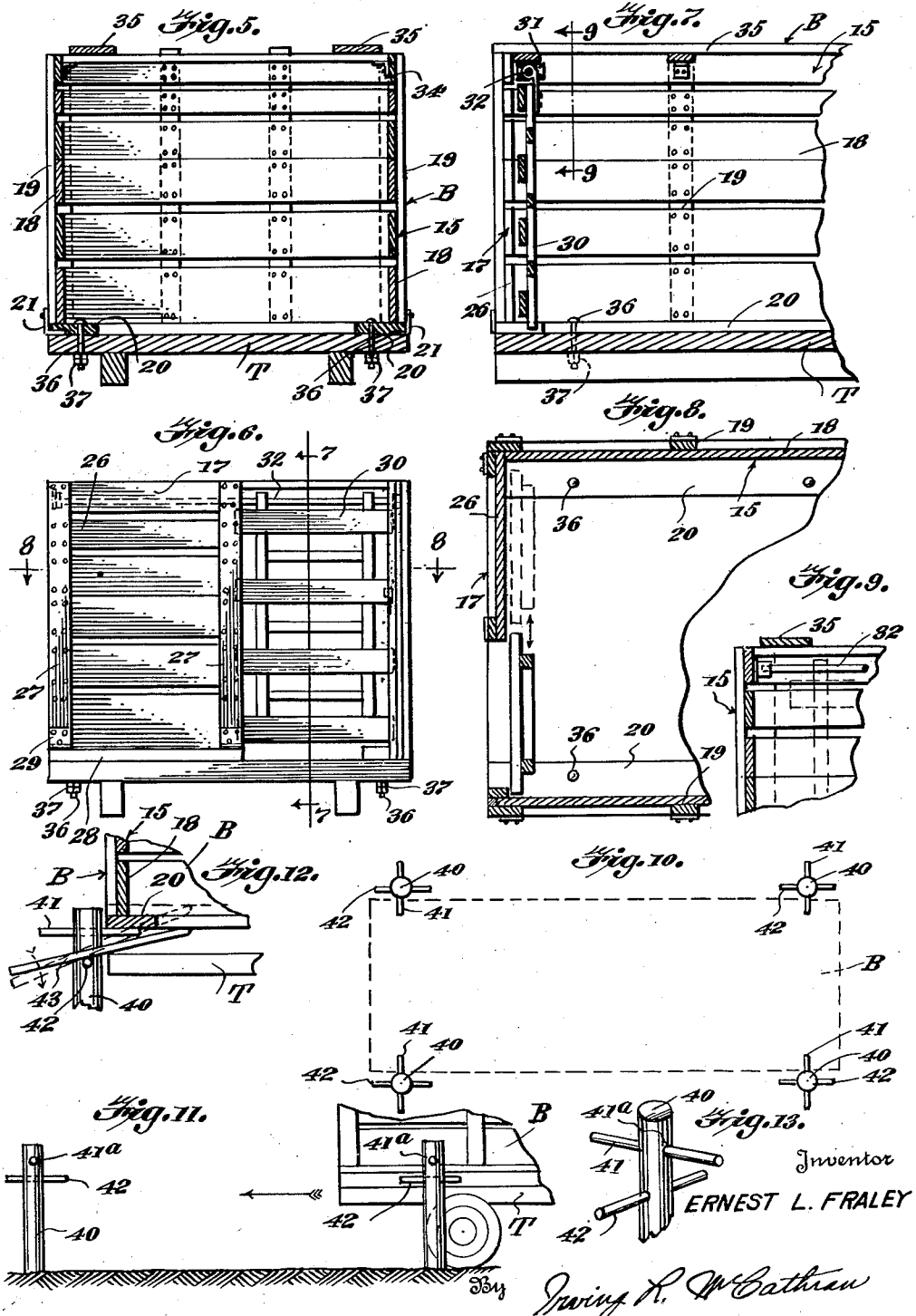
Inventor
ERNEST L. FRALEY
By Irving R. McCathran
Attorney Patented Sept. 7, 1943

2,328,971

UNITED STATES PATENT OFFICE 2,328,971

REMOVABLE VEHICLE BODY AND MEANS FOR SUPPORTING SAME

Ernest L. Fraley, Gaithersburg, Md.

Application November 20, 1940, Serial No. 366,489

1 Claim. (Cl. 296—10)

This invention relates to vehicle bodies and means for facilitating the placing of a body upon a vehicle and also for facilitating the removal of the body from a vehicle.

One of the principal objects of this invention is the production of a simple and efficient open-bottom body construction which is thoroughly braced across the top thereof in a manner whereby the sides and ends will be firmly held together to resist strain placed thereon from the interior of the body.

A further object of this invention is the provision of means for supporting the body in a position whereby the body may be quickly placed upon a truck or other vehicle with a minimum amount of effort and may be lifted or removed from a vehicle without the necessity of employing a complicated mechanism.

Other objects and advantages of the present invention will appear throughout the following specification and claim.

In the drawings:

Figure 1 is a side elevational view of the removable or demountable vehicle body, a portion of the vehicle being shown;

Figure 2 is a top plan view of the removable or demountable body;

Figure 3 is a front elevational view of the demountable body, a portion of the truck being shown in section;

Figure 4 is a fragmentary perspective view illustrating one corner of the demountable body and also illustrating a portion of the floor of the supporting truck;

Figure 5 is a vertical sectional view taken on line 5—5 of Figure 1;

Figure 6 is a rear elevational view of the demountable body shown mounted upon the floor of a truck;

Figure 7 is a vertical sectional view taken on line 7—7 of Figure 6;

Figure 8 is a fragmentary horizontal sectional view taken on line 8—8 of Figure 6;

Figure 9 is a fragmentary vertical sectional view taken on line 9—9 of Figure 7;

Figure 10 is a top plan view of the supporting rack illustrating the arrangement of the supporting posts, the demountable body being shown in dotted lines;

Figure 11 is a side elevational view of the supporting rack and showing a portion of a truck entering the rack prior to demounting the body from the truck;

Figure 12 is a fragmentary vertical sectional view through the body and illustrating a portion of one of the supporting posts of the rack and showing the manner in which the body may be lifted to be supported upon the supporting rods carried by the rack;

Figure 13 is a fragmentary perspective view of a portion of one of the supporting posts of the rack.

By referring to the drawings it will be seen that B designates the demountable body and T designates the supporting truck or vehicle. The body B preferably comprises an open-bottom structure having two parallel sides 15, a front wall 16, and a rear wall 17. The sides 15 comprise a plurality of longitudinally extending panels 18 which are supported by vertically extending braces 19, these braces 19 being in turn secured to the bottom side rails 20 by means of angle braces 21 of a suitable type. The bottom side rails extend for the full length of the body and form an integral part of the body B. The front end wall 16 also comprises a plurality of horizontally extending panels 22 which are braced by means of the vertically extending braces 23, these braces 23 being secured to the front bottom rail 24 by means of suitable angle braces 25. The bottom side rails 20 are broad and flat and extend in a horizontal plane so as to rest in a flat position throughout their entire length upon the upper face of the supporting truck T, as shown in Figures 1, 5 and 7.

The rear wall 17 comprises a plurality of horizontal panels 26 which are anchored upon the vertical braces 27, and these braces 27 are secured to the bottom rail 28 by means of the angle braces 29. The end wall 17 preferably extends across one-half the width of the demountable truck body and a sliding gate 30 of a suitable type is adapted to close the remaining one-half of the rear end of the truck body. This gate 30 is suspended between suitable hangers 31 which are slidably mounted upon a rod 32 supported across the rear top portion of the truck body and this gate 30 is so mounted as to move to and from a closing position as indicated in dotted lines in Figure 8 to permit the entrance of cattle into and from the body, or to permit the placing of and the removal of articles into and out of the body. A suitable fastening element of a desired type may be employed to hold the gate in a closed position without departing from the spirit of the invention.

By carefully considering the drawings, it will be noted that the sides 18 are braced across the top thereof by means of transversely extending suitably spaced bracing bars 33 and these bars 33 preferably extend transversely across the top of the body connecting the vertical braces 19 of the sides 18, and suitable angle braces 34 are preferably employed to brace the corners or junction of the braces 33 with the bars 19.

A relatively wide longitudinally extending bracing member 35 extends longitudinally of the full length of the top of the body near each side 18, as shown in detail in Figure 2, and is anchored to each of the braces 33 thereby thoroughly reinforcing and tying the sides, end and rear walls together and thoroughly bracing the demountable body along the top of the body, and at the same time providing an open-top body. This is a very important feature of the invention in that the necessity of thoroughly bracing the sides, end and rear walls of a body particularly adapted for transporting live stock and the like, is of utmost importance. In view of the fact that the present invention embodies an open-bottom demountable body the bracing of the top of the body in the manner specified and as clearly illustrated is of obvious importance. It will be noted that the body illustrated is open at the bottom and the bottom comprises the longitudinally extending rails 20 which are secured to the sides 18 and the transverse rail 24 which extends across the front of the body at the bottom thereof. These rails 20 and 24 are adapted to be anchored to the floor of the truck or other vehicle T by means of anchoring bolts 36 which pass transversely through the rails 20 and 24 and are adapted to pass through apertures or stake holes formed in the floor of the truck T. Suitable nuts 37 may be placed upon the bolts 36 to anchor the bolts in position. These nuts 37 may be readily removed and the bolts 36 may be also removed when it is desired to dismount the body B from the truck T. When the body B is mounted upon the truck T, however, it should be understood that the bolts 36 will firmly anchor the bottom rails 20 upon the truck body T, the bottom rails 20 being preferably relatively wide to provide a broad resting surface to contact the top face of the floor of the truck T. Through the medium of the structure illustrated and described, it should be understood that an efficiently braced, sturdy and economical demountable body is provided which will resist internal pressure from live stock carried therein, all of the parts being tied together in such a manner as to brace the body longitudinally, vertically and transversely.

In conjunction with the particular body structure above described, an important feature of the present invention is the supporting rack for the demountable body whereby the body may be efficiently supported in a position to facilitate the mounting and dismounting of the body upon and from a vehicle such as a truck and the like. This rack comprises a plurality, preferably four in number, of vertical posts 40 which are arranged in the formation of a hollow rectangle properly spaced to permit the demountable body to pass between two pairs of posts, as illustrated in Figure 10. Each post carries a removable, rotatable body-supporting bar 41 which extends transversely through the posts 40 near the top thereof, and transversely of the body B so as to provide a rest between the opposite transverse posts upon which the body B is adapted to rest in the manner shown in Figure 12. Each post also carries a lever-engaging rod 42 which rod 42 extends at right angles to the rod 41 in each instance, or longitudinally of the demountable body when the body is in its position upon the rack.

When it is desired to remove the body B from the truck T, the truck is backed in position under the supported body and the lever 43 is used in the manner above described to lift the body from the rods 41 and the rods or bars 41 are removed and the lever is withdrawn to allow the body to drop down upon the truck. This same operation is repeated with respect to each corner of the truck and body, and the body is then anchored upon the truck through the medium of the anchoring bolts 36, above described.

Because of the manner in which the body is supported upon the rods 41 when in a supporting position, it should be understood that the body B may be slightly adjusted as to its position to accommodate the body to the position of the truck if any slight adjustment is necessary due to the fact that the body will be supported upon the circular rods or supporting bars 41 which bars or rods are rotatably and adjustably mounted within the apertures 41ᵃ of the posts 40.

It should be understood that certain detail changes in the mechanical construction and arrangement of parts may be employed without departing from the spirit of the invention, so long as such changes fall within the scope of the appended claim.

Having described the invention, what I claim as new is:

A demountable body of the class described having an open bottom extending from end to end and a transversely and longitudinally braced top, the body also having an open end for loading and unloading, broad flat bottom side rails secured to the bottom of the body and extending in a horizontal plane from end to end of the body longitudinally of the sides thereof, said bottom side rails being adapted to lie flat upon a support throughout their entire transverse and longitudinal areas to provide broad flat footings for the body as the body rests upon a support to resist tilting and twisting strain of the body when the body is carried by a moving support, and anchoring means engaging the body for firmly anchoring the bottom side rails flat upon a support.

ERNEST L. FRALEY.